Sept. 14, 1954   A. AESCHLIMANN   2,689,335
ALTERNATING CURRENT BRIDGE NETWORK
Filed Nov. 8, 1950
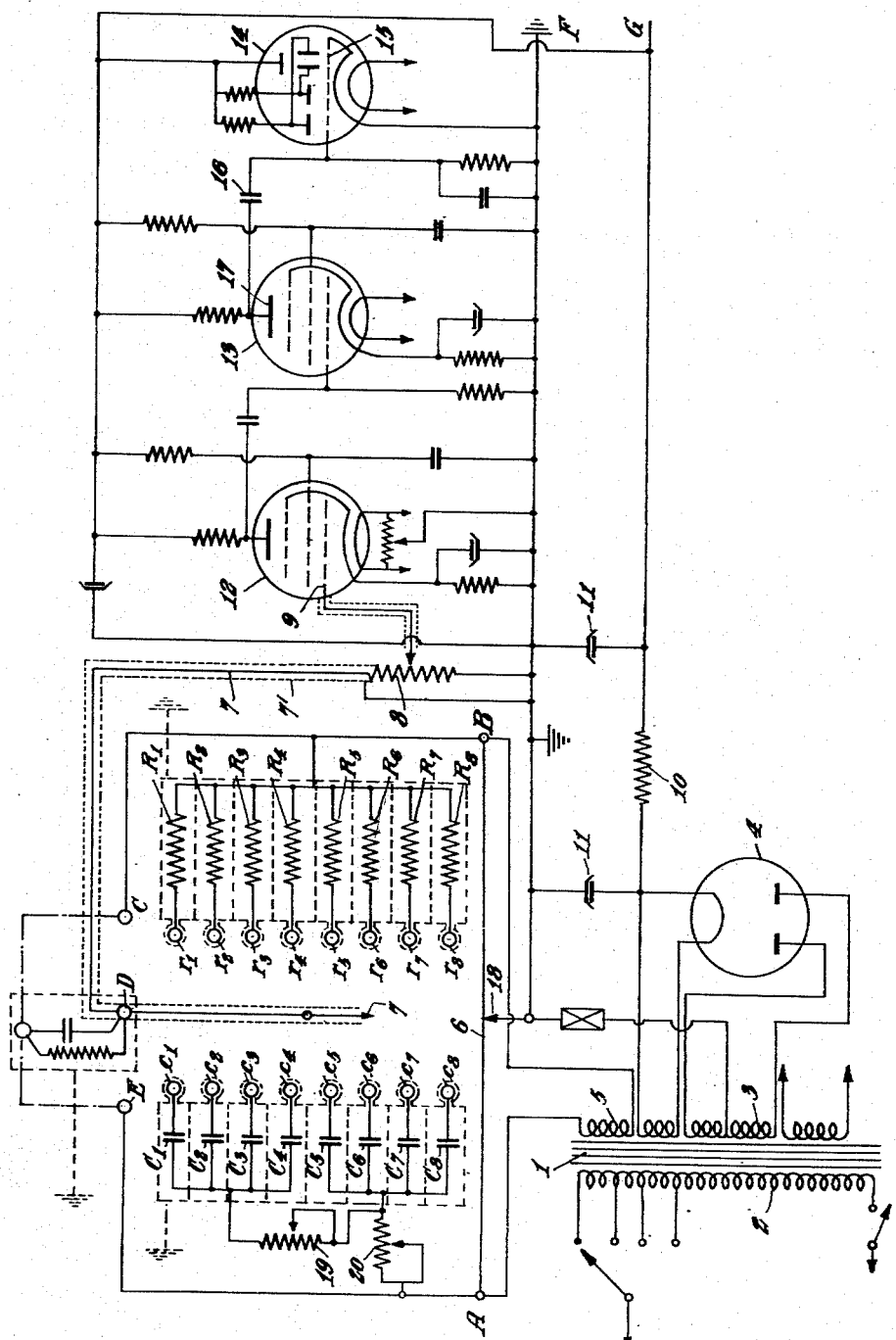
INVENTOR:
ALBERT AESCHLIMANN Patented Sept. 14, 1954

2,689,335

UNITED STATES PATENT OFFICE 2,689,335

ALTERNATING CURRENT BRIDGE NETWORK

Albert Aeschlimann, Berne, Switzerland

Application November 8, 1950, Serial No. 194,619

Claims priority, application Switzerland October 26, 1950

4 Claims. (Cl. 324—60)

The present invention relates to an alternating current bridge network, and more particularly to a device for accurately measuring small capacitances and high resistances.

For the measurement of resistance and of capacitance there are known numerous devices, which are based on the principle of the Wheatstone and other bridge networks. For reliable measurements of very small capacitances e. g. of 0.1 $\mu\mu$f. there have existed till now only devices employing frequencies of the order of magnitude of audio or high frequencies, which are very expensive. By utilizing line or main frequencies, such devices for the measurement of small capacitances and of high resistances would become much simpler and less expensive, but this simplification is followed by sources of error and disturbances, which cause errors in the measurement results, namely: asymmetry of the power supply and the power supply transformer, hand capacity of the operator, capacitive influences among the standards of the different ranges and their influence upon the slider. If the usual high-ohmic potentiometer is used in the bridge circuit, the capacity between the potentiometer and the chassis and other components causes errors in the results of the measurement. The tapping switches previously employed for switching the desired standards into the bridge circuit are not advantageous since the result of the measurement of small capacitances and of high resistances have no value, first because of the mutual capacitances of all the standards among themselves and against the slider (input of the amplifier), and second because of the galvanic coupling of the components due to the conductivity of the insulating material of the switches dependent on the humidity of air.

The present invention provides a universal alternating current bridge network for the measurement of capacitances and resistances including very small capacitances of e. g. 0.1 $\mu\mu$f. and very high resistances of e. g. 30,000 megohms, the above mentioned disadvantages and disturbances influencing the result of the measurement being removed.

According to the present invention, the slide wire of the bridge network has an internal resistance of less than 100 ohms and the standards and the object to be measured each are shielded against each other component. Further there is provided a shielded plug connection for the insertion of the desired standard into the bridge circuit.

The above description and objects of the present invention will be best understood by reference to the specification taken in conjunction with the drawing wherein:

The single figure shows by way of example a schematic diagram of an embodiment of the object of the invention.

The transformer 1 of the A. C. bridge network as illustrated can be connected by means of corresponding taps of the primary winding 2 to the normal frequency mains having a voltage of 125, 145, 220 or 250 volts. The secondary winding 3 of the transformer feeds a full-wave rectifier valve 4, and by another secondary winding 5 of the transformer, a voltage of about 1 volt is supplied to the ends A and B of the slide wire 6 of the bridge circuit, for the purpose of the measurement of low resistances and of low voltage electrolytic condensers. To the end A of the slide wire 6 are connected the first plates of the eight standards of capacitance $C_1, C_2, \ldots C_8$, the smallest of which has a capacity of, for example, 10$\mu\mu$f., the second plates being connected to respective jacks $c_1, c_2, \ldots c_8$. To the end B of the slide wire are connected the one ends of eight standards of resistance $R_1, R_2, \ldots R_8$, the other ends being connected to respective jacks $r_1, r_2, \ldots r_8$. The unknown capacitance to be measured is connected to the points C and D of the bridge circuit; the unknown resistance to be measured is connected to the points E and D. Each of the points C, D and E of the bridge network is formed by a jack, which, like the jacks $c_1$ to $c_8$ and $r_1$ to $r_8$ are mounted in the chassis of the apparatus insulated from each other.

The standards $C_1$ to $C_8$ and $R_1$ to $R_8$ each are shielded, and the desired standard can be put in circuit by the help of a shielded plug connection 7, which leads to a shielded jack D and then to a potentiometer 8 at the input 9 of a capable amplifier, which serves as highly sensitive indicating device for the bridge balance. During measurement, the test piece (capacitance or resistance) is placed into a screen cover installed, for example, in the chassis of the apparatus and is connected by means of plug connections to the jacks C and D, E and D respectively, the connection to jack D being shielded. All the shieldings inclusive of the screen cover, of which in the drawings the shielding 7' of the plug connection 7 is indicated, are connected to the chassis. The rectifier valve 4 and a filter consisting of a resistance 10 and two electrolytic condensers 11 supply a direct current voltage to the points F and G, which voltage serves as operating voltage for the amplifier, which consists of two pentodes 12 and 13 and a cathode ray tuning indicator (magic eye) 14, the grid 15 of which is coupled to the anode 17 of the pentode 13 by means of a condenser 16. The opening of the shadow region of the magic eye indicates the special position of the slider 18 which slides along the slide wire 6 of the bridge network, at which the bridge is balanced, that is, when there is no voltage between slider 18 and point D. Point F is connected to chassis and hence also slider 18. Conveniently the slider 18 consists of hardened steel and has a high-polished contact edge rounded off to a radius of approximately 0.5 mm., thereby resulting in practically no abrasion at the slider or at the slide wire.

The slide wire 6 of the bridge network has an internal resistance of less than 100 ohms, e. g. only 1.3 ohm. This resistance is chosen extremely low-ohmic so that the slide wire, which is connected to the first plates of the standards of capacitance $C_1$ to $C_8$ (point A) and to all standards of resistance $R_1$ to $R_8$ (point B) and moreover to the first plate of the capacitance to be measured and to the resistance to be measured respectively, has a capacitive impedance against the chassis and the other components, which depending of the position of the slider 18, is shunted to a part of the ohmic slide wire resistance and is relatively high-ohmic and hence has no influence upon the ohmic slide wire resistance. The shieldings connected to the chassis exclude disturbing influences between the standards, and due to the arrangement of the plug connection, instead of the usual tapping switch, there is also no disturbing galvanic coupling. Since the capacity of the plug connection 7 against its shielding forms a capacitive shunt parallel to the input of the amplifier, no errors in the result of the measurement may occur, this shunting reducing the gain of the amplifier only insignificantly. The same insignificant reduction in gain is caused by; the pure ohmic leakage resistances of D against the chassis, originating from the relative conductivity of the insulated jacks D; $c_1$ to $c_8$; $r_1$ to $r_8$; the insulation of the plug connection 7; the potentiometer 8 and other possible leakage resistances, all of which shunt the amplifier input. A ground connection of the bridge is not necessary. Furthermore the main circuit connection may be reversed without any influence on the measurement.

By means of the bridge network described, so-called three point condensers (shielded condensers) can be tested directly, the shielding being connected galvanically to the chassis, the first plate being connected to point C of the bridge and thus to the slide wire 6, and the second plate being connected to point D and across the plug connection 7 to the input grid 9 of the amplifier. The capacity of said second plate against the chassis has no other effect than shunting the amplifier input. In an analogous way, high-ohmic shielded resistances can be measured. Those resistances have to be connected to the points E and D. The capacities of the test object against the chassis again have no influence upon the measurement.

The preceding considerations show, that neither the capacitance of the connections, nor the capacitance of the cables, nor the capacitance of the two plates of the condenser against the chassis, nor the capacitance of the resistances against the chassis have any influence upon the results of the measurement. It is therefore possible to test those objects, which because of their size can not be placed within the screen cover, by placing them within an external screen cover. This external screen cover is then connected directly to the chassis, the test object by means of an electric line to the points C or E respectively and by means of a shielded line to point D. In any case, the kind and the length of the required junction cables have no influence upon the results of the measurement, even if very small condensers and very high resistances have to be tested.

The bridge circuit as described offers the possibility of using external standards for special measurements. The corresponding external standard is connected to the points D and E of the bridge network for the measurement of capacitances and to the points D and C for the measurement of resistances. By means of special standards, self-inductances can be measured with the present bridge network. The standards of self-inductance are connected to the points C and D.

For the phase compensation at the measurement of condensers there are provided two potentiometers 19 and 20 in series with the standards of capacitance, the potentiometer 19 serving for the phase compensation within the four lower ranges and the potentiometer 20, serving for the phase compensation within the four upper ranges.

Accordingly, an alternating current bridge network for measuring electrical components, such as small capacitances and high resistances, has been provided, said network comprising a low impedance slide wirt having terminals, a source of potential connected across the terminals of said slide wire, at least one group of electrical standards each having one end electrically connected to one of said terminals, a jack connected to the other end of each of said electrical standards, first jack means connected to the other of said terminals, detector means, second jack means connected to said detector means, electrically shielded plug means connected to said second jack means and selectively insertable in the jacks of the respective electrical standards whereby any one of said electrical standards may form the known arm of said bridge network, further plug means adapted to be connected to the electrical component to be measured and insertable in said first and second jack means whereby said electrical component may form the unknown arm of said bridge network, and slider means movable along said slide wire in electrical contact therewith and subdividing said slide wire into two balance arms for said bridge network, said slider means being fabricated of hardened steel and having a highly polished rounded-off contact edge.

While a preferred embodiment of the invention has been shown and herein described, it will be understood that the same is capable of modifications without departure from the general scope and spirit of the invention as defined in the claims.

Having thus described the invention, what is claimed as new and desired to be secured by Letters Patent, is:

1. An alternating current bridge network for measuring electrical components, such as small capacitances and high resistances comprising a low impedance slide wire having terminals, a source of potential connected across the terminals of said slide wire, at least one group of electrical standards each having one end electrically connected to one of said terminals, a jack connected to the other end of each of said electrical standards, first jack means connected to the other of said terminals, detector means, second jack means connected to said detector means, an electrically shielded plug means connected to said second jack means and selectively insertable in the jacks of the respective electrical standards whereby any one of said electrical standards may form the known arm of said bridge network, further plug means adapted to be connected to the electrical component to be measured and insertable in said first and second jack means whereby said electrical component may form the unknown arm of said bridge network, and slider means movable along said slide wire in electrical contact therewith and subdividing said slide wire into two balance arms for said bridge network, said slider means being fabricated of hardened steel and having a highly polished rounded-off contact edge.

2. A network according to claim 1, wherein said slide wire has a resistance of less than one hundred ohms.

3. A network according to claim 1, wherein said electrical standards are shielded from each other and from the other arms of said bridge network.

4. A network according to claim 1, further including a grounded screen cover adapted to receive the electrical component to be measured.

References Cited in the file of this patent

UNITED STATES PATENTS

| Number | Name | Date |
|---|---|---|
| 2,190,488 | Schnoll | Feb. 13, 1940 |
| 2,273,066 | Povey et al. | Feb. 17, 1942 |
| 2,326,274 | Young | Aug. 10, 1943 |
| 2,329,098 | Browning et al. | Sept. 7, 1943 |
| 2,381,155 | Frommer | Aug. 7, 1945 |
| 2,431,841 | Storm | Dec. 2, 1947 |